United States Patent [19]
Allard et al.

[11] Patent Number: 5,815,142
[45] Date of Patent: Sep. 29, 1998

[54] APPARATUS AND METHOD FOR MARKING TEXT ON A DISPLAY SCREEN IN A PERSONAL COMMUNICATIONS DEVICE

[75] Inventors: David Joseph Allard, Boynton Beach; James Robert Lewis, Coconut Creek; Debra Ann Gawne Johnson, Fort Lauderdale; Francis James Canova, Jr., Boynton Beach; Charles Sterling Lanier, Delray Beach; William Villafana, Davie; Byron Kevin Tiller, Boca Raton; Raymond Lee Yee, Coral Springs; Julie Francis Goodwin; Jean Luter Stout, both of Boca Raton; Peter Rowland Eastwood, Delray Beach; Daniel Ming-Te Hsieh; Connie Yudip Au, both of Coral Springs, all of Fla.

[73] Assignee: International Business Machines Corporation, Armonk, N.Y.

[21] Appl. No.: 576,834

[22] Filed: Dec. 21, 1995

Related U.S. Application Data

[63] Continuation of Ser. No. 279,639, Jul. 25, 1994, abandoned.

[51] Int. Cl.$^6$ ........................................ G09G 5/00
[52] U.S. Cl. ........................................ 345/173; 345/179
[58] Field of Search ........................ 345/156, 173, 345/179, 174, 180, 175, 158, 157, 168; 178/18, 19; 379/96; 341/22, 33, 34; 359/803

[56] References Cited

U.S. PATENT DOCUMENTS

| | | | |
|---|---|---|---|
| 4,202,038 | 5/1980 | Petersson | 364/709 |
| 4,570,217 | 2/1986 | Allen et al. | 364/188 |
| 4,707,845 | 11/1987 | Krein et al. | 178/18 |
| 4,728,936 | 3/1988 | Guscott et al. | 345/173 |
| 4,839,634 | 6/1989 | More et al. | 345/173 |
| 4,870,677 | 9/1989 | Di Santo et al. | 379/96 |
| 4,908,612 | 3/1990 | Bromley et al. | 345/168 |
| 4,914,358 | 4/1990 | Nakamura | 341/73 |
| 4,972,496 | 11/1990 | Sklarew | 178/18 |
| 5,142,677 | 8/1992 | Ehlig et al. | 395/650 |
| 5,157,737 | 10/1992 | Sklarew | 178/18 |
| 5,194,852 | 3/1993 | More et al. | 345/182 |
| 5,258,748 | 11/1993 | Jones | 345/172 |
| 5,297,216 | 3/1994 | Sklarew | 382/13 |
| 5,305,446 | 4/1994 | Leach et al. | 395/425 |
| 5,335,276 | 8/1994 | Thompson et al. | 379/434 |
| 5,347,295 | 9/1994 | Agulnick et al. | 345/156 |
| 5,376,945 | 12/1994 | Takemaka et al. | 345/173 |
| 5,555,363 | 9/1996 | Tau et al. | 395/803 |

OTHER PUBLICATIONS

"Mouse Emulation for Digitizer/Touch Panel" IBM Technical Disclosure Bulletin vol. 33 No. 7 Dec. 1990, pp. 216–217.

"Simon" from Bell South Designed by IBM.

*Primary Examiner*—Dennis-Doon Chow
*Attorney, Agent, or Firm*—Pollock, Vande Sande & Priddy; George Grosser

[57] ABSTRACT

In a personal communications device having a touch sensitive display screen, text may be marked by a user to be used with different applications. In particular, to begin marking, a user has to maintain his touch at a location on the screen for a short predetermined period of time until the system detects that the position is held over the same character for a delayed period, at which time the system beeps to provide an indication that there has been a change of operation mode. The marking mode continues in operation until the user removes his contact from the touch screen. Thus, text over which the contact point passes after the initiation of the marking mode is marked, until the user removes his contact point from the touch screen. A second beep is sounded to alert the user of the termination of the marking mode, and the appearance of a menu of operations on the screen. The menu of operations echoes the marked text for user confirmation. The marked text may be used by the user in a number of applications, among which include a calling application whereby the marked text is used to place a call.

1 Claim, 6 Drawing Sheets

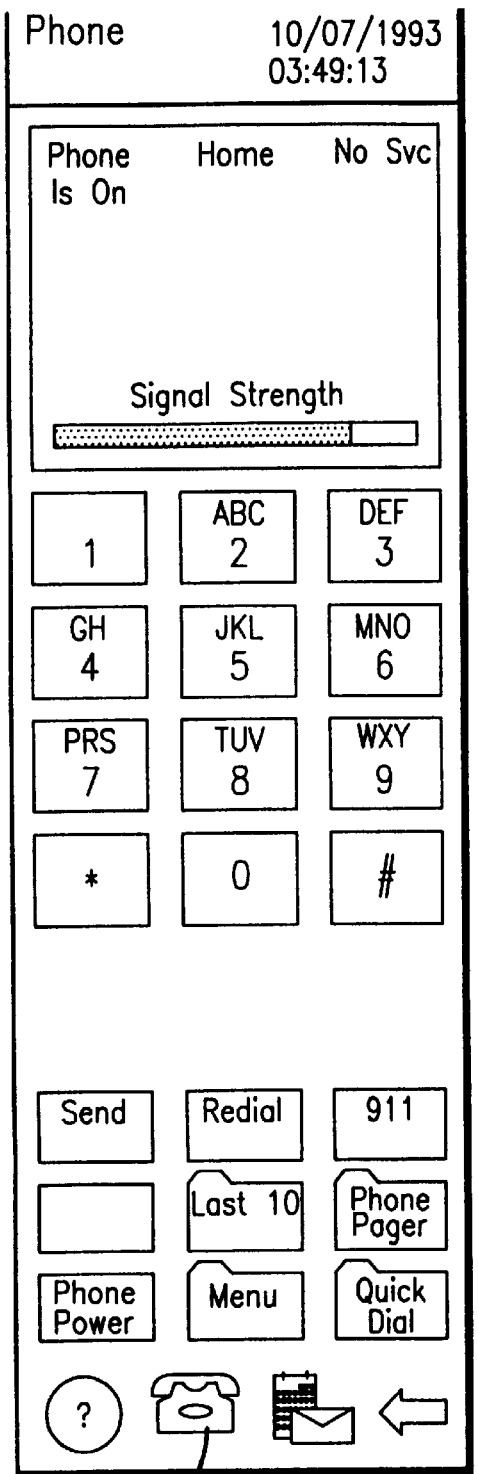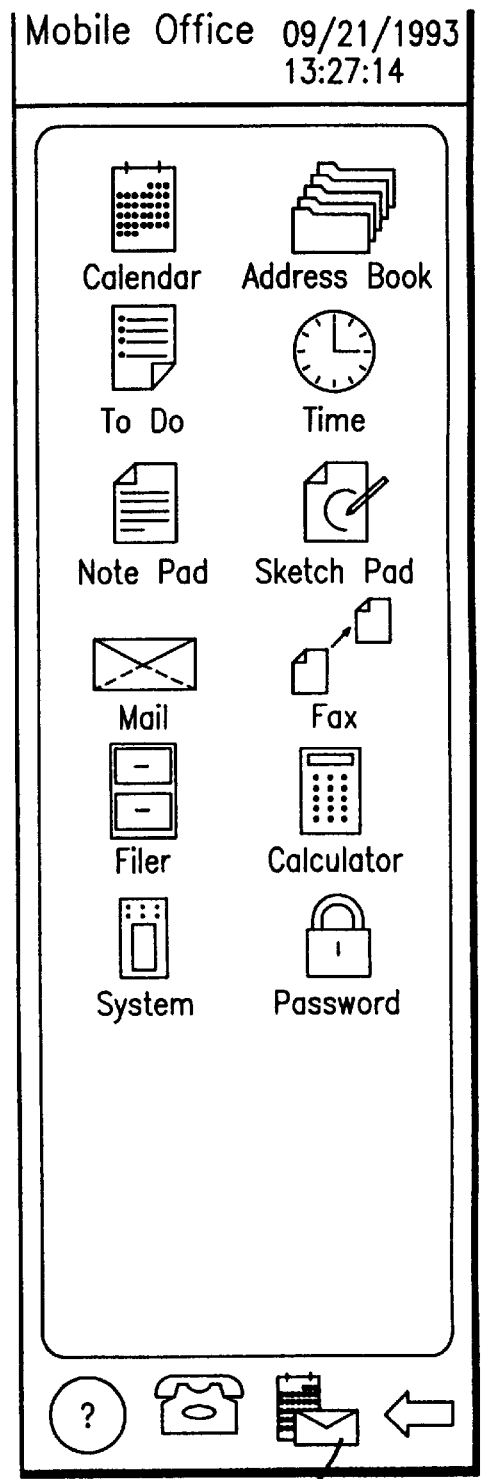
The Phone Screen
FIG. 3
The Mobile Office Screen
FIG. 4

APPARATUS AND METHOD FOR MARKING TEXT ON A DISPLAY SCREEN IN A PERSONAL COMMUNICATIONS DEVICE

This application is a File Wrapper Continuation of U.S. patent application Ser. No. 08/279,639, filed Jul. 25, 1994 now abandoned.

FIELD OF THE INVENTION

The present invention relates to data processing system and more particularly to a personal data processing communications system that has a touch sensitive display screen.

BACKGROUND OF THE INVENTION

This invention relates to a co-pending application entitled "Field Programming Apparatus and Method for Updating Programs in a Personal Communications Device", having Ser. No. 08/ 279,638 filed on Jul. 25, 1994, and assigned to the same assignee of the instant application. The disclosure of the just noted application is incorporated by reference herein.

As disclosed in the just noted application, a personal communications device SIMON, announced by the IBM Corporation in 1994, includes many features for facilitating personal communications. As shown in FIGS. 1 and 2, the SIMON personal communications device 2 resembles, and is, a cellular telephone. Further, it is an electronic pager. In addition, it is capable of facsimile transmission and reception, as well as electronic mail sending and receiving. Moreover, a computer note pad, address book and calendar are all provided within system 2.

As shown, system 2 has a speaker 4, an on and off switch 6, volume adjust switches 8a and 8b, a touch sensitive screen 10, a PCMCIA card receptacle slot 12, a PCMCIA card release switch 14, a battery pack 16, an input/output connector 18 and a microphone 20. Also provided with the system is a stylus 22, which may be used to interact with touch sensitive screen 10. It should be noted, however, that in place of stylus 22, a user can also use his finger. To act as a cellular device, an antenna 24 is extendable from the body of the device 2.

Inasmuch as data is stored in the SIMON device (for example in the address book) and the device itself is capable of receiving different types of messages via fax and E-mail messages, to be useful, it becomes incumbent that the data can easily be retrieved by the user. This is particularly true in instances where telephone numbers are to be referenced from the display screen. A need therefore arises for a user to be able to efficiently extract and use relevant information from either the received messages or previously stored data directly from the display screen.

BRIEF DESCRIPTION OF THE PRESENT INVENTION

To be able to efficiently retrieve particular data being displayed, a user can mark the number or text that he desires by initiating a mark mode on the touch overlay membrane of the display. To initiate the mark mode, the user has to touch the screen so as to bring the cursor directly under the point of contact. Thereafter, the cursor becomes responsive to the touch on the display. If the user at this time touches the screen and then slides his finger (stylus), the cursor will follow the movement of the sliding contact point. To mark text (which includes letters, numbers and spaces), the user needs to point to the beginning of the text that he wants to mark. Once the cursor is at the start of the desired text, the user would continue to touch the same position for a short period of time (which for this invention may for example be approximately 0.5 to 1.0 second). At the end of which time the system changes from a cursor sliding operation mode to a cursor mark mode. The device then sounds a beep to indicate that it has entered the mark mode.

Upon initiation of the mark mode, text over which the finger moves is marked and a character count thereof is stored. When the user reaches the end of the text he wishes to mark, he releases his contact point with the display. At this time a beep having a second tone that is different from the first beep sounds from the device to indicate to the user that the marked text is accepted (i.e. the termination of the mark mode). A menu of operations, represented by either function keys or icons, now appears on the display. At or about the same time, the marked text is displayed in a pop-up window to enable the user to verify that the desired text has been marked correctly. Upon confirmation of the marked text, the user can press any one of the function keys or icons to begin an application that utilizes the marked text. When an activated application is the call application and the marked text is a telephone number, a call is made to the telephone number through the communications interface incorporated within the device.

It is therefore an objective of the present invention to provide a user an efficient method of marking desired text on a touch sensitive screen.

It is another objective of the present invention to provide a user the ability to retrieve displayed information for use in any one of a number of applications.

It is yet another objective of the present invention to provide a user the ability of marking text from received messages and previously stored data.

BRIEF DESCRIPTION OF THE DRAWINGS

The above mentioned objectives and advantages of the invention will become more apparent and the invention itself will be best understood by reference to the following description of an embodiment of the invention taken in conjunction with the accompanying drawings wherein:

FIG. 3 is an enlarged view of one of the available display screens of the FIG. 1 device;

FIG. 4 is another exemplar display screen of the FIG. 1 device;

DETAILED DESCRIPTION OF THE INVENTION

With reference to FIG. 3, the display 10 of the personal communications device of the instant invention can be selected to have a phone screen, by the user pressing the phone icon 26 at the bottom of the screen, which enables the user to use device 2 as a cellular telephone. A more detailed discussion of the touch sensitive display is given in patent applications entitled "Personal Communicator Having Improved Contrast Control For A Liquid Crystal, Touch Sensitive Display" having Ser. No. 08/146,342 and "Personal Communicator Having Improved Zoom and Pan Functions for Editing Information on Touch Sensitive Display having Ser. No. 08/146,341", both assigned to the same assignee of the instant invention and filed on Nov. 1, 1993. The respective disclosures of those applications are incorporated herein by reference.

When icon 28 is touched at the bottom of the screen, the mobile office screen shown in FIG. 4 is displayed. As can be seen, there are a number of different applications which the data processing system of device 2 is capable of. For example, device 2 has its own calendar and note pad, as well as a filer and an address book. In addition, it is capable of E-mail operation via the icon entitled "Mail" and a facsimile operation via the icon entitled "Fax".

To enable the device to perform the variety of communications, different communications links besides the radio link provided by the cellular telephone are also integrated to device 2. These different types of communication links are described in the above referenced co-pending application.

A more detailed discussion of the integrated communications interface subsystem incorporated within device 2 is given in part, or all, in the following co-pending applications: "Integrated FAX Send/Receive on Cellular and PSTN" having Ser. No. 08/279,644 filed Jul. 25, 1994, "Consistent User Interface for Cellular and PSTN Environments" having Ser. No. 08/279,413 filed Jul. 25, 1994, and "Modem Ring Indicate Signal From Either PSTN or Cellular System", having Ser. No. 08/279,659 filed Jul. 25, 1994. All of the just noted applications are assigned to the same assignee as the instant invention and their respective disclosures are incorporated by reference to the instant disclosure.

Figure 1:
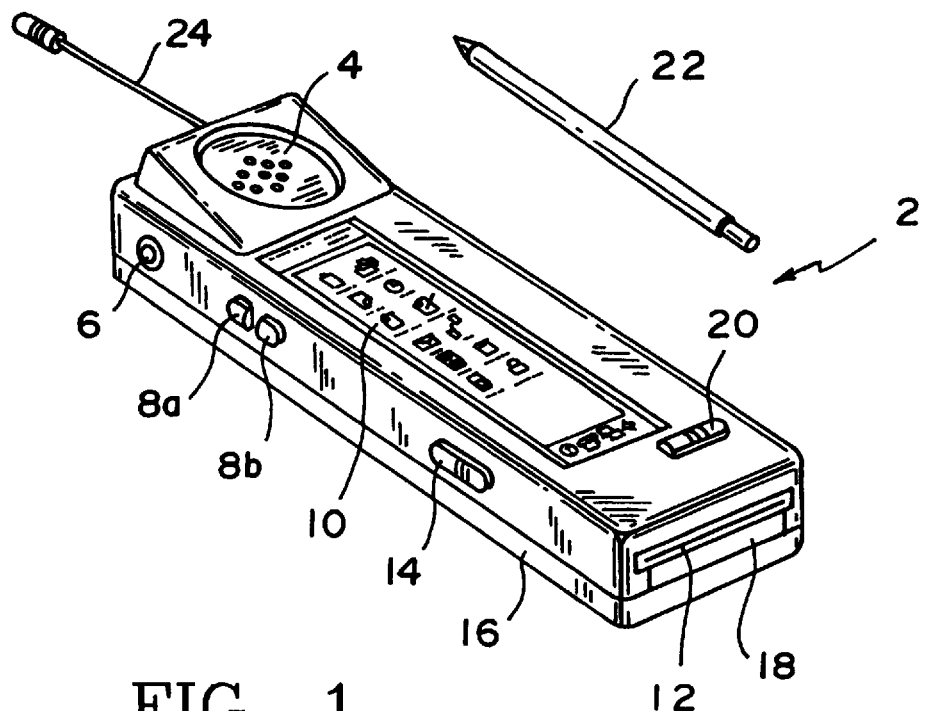
FIG. 1 is a perspective view of the personal communications device of the instant invention.
Figure 2:
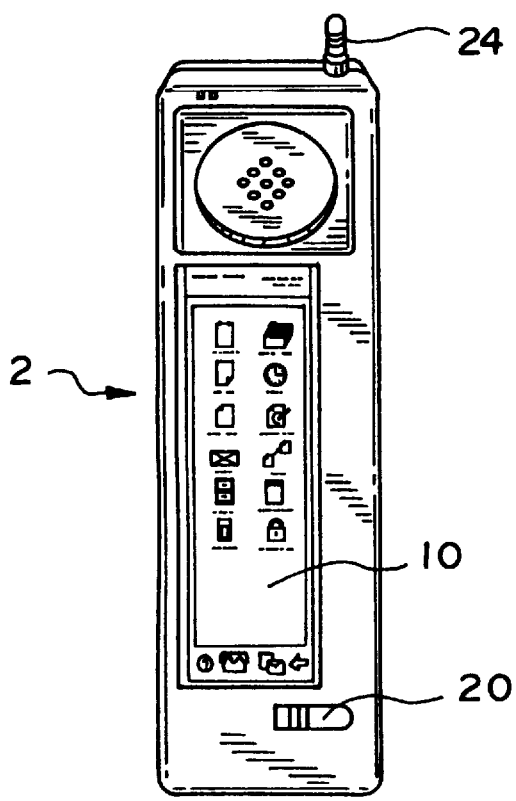
FIG. 2 is a plan view of the FIG. 1 device.
Figure 5:
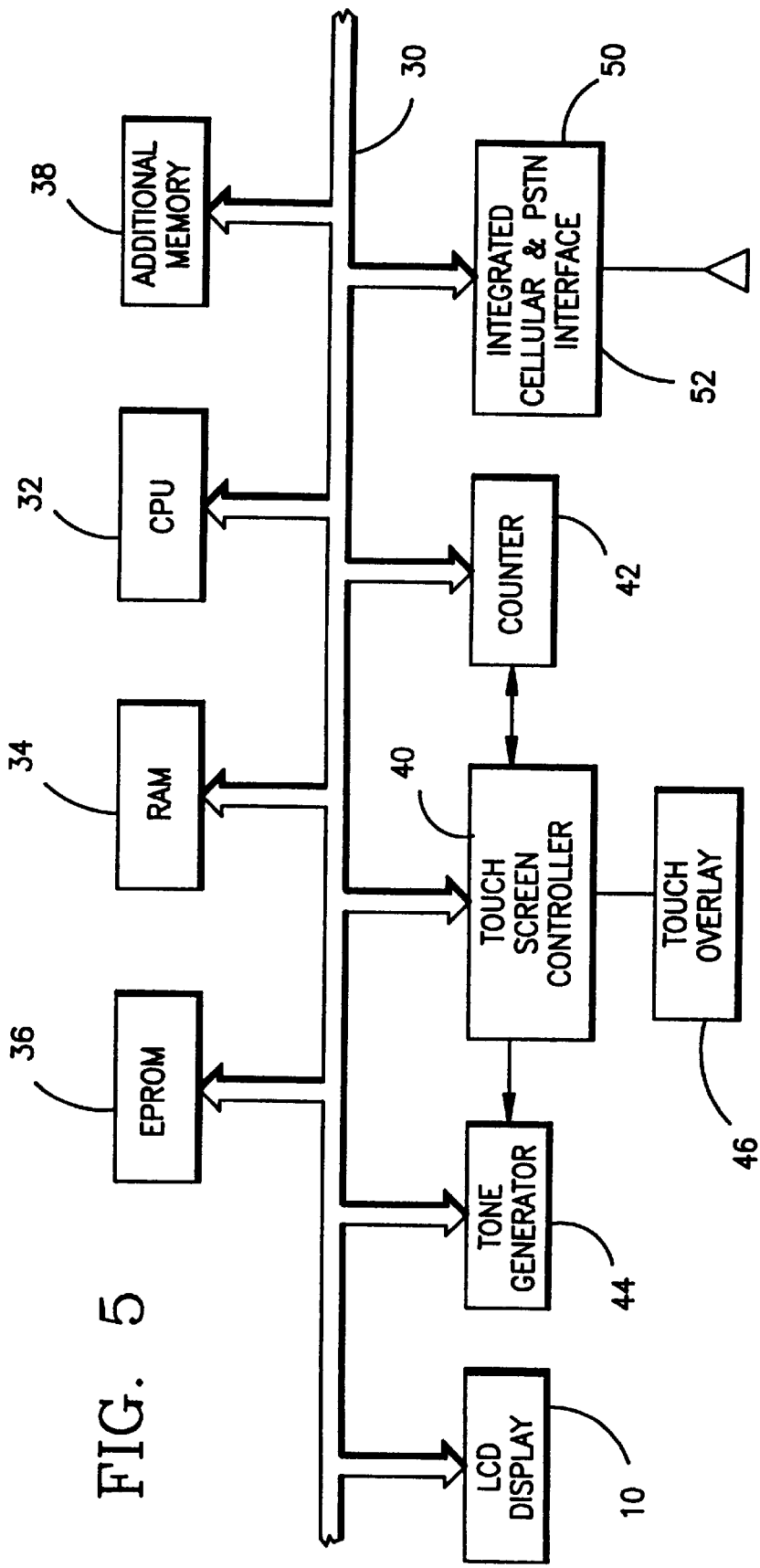
FIG. 5 is a simplified block diagram of the different components of the FIG. 2 device which are relevant to the instant invention.

FIG. 5 is a simplified block diagram of device 2 of the instant invention which illustrates components only relevant to the instant invention. (A more detailed illustration of the different components of device 2 may be gleaned from the first referenced copending application). As shown, connect to the system bus 30 of the instant invention system is a processing unit 32. A number of different types of memories such as RAM 34, EPROM 36 and additional memory 38 are also connected to system bus 30. Memory 38 may be in the form of a PCMCIA (personal computer memory card international association) standard card inserted to receptacle slot 12 of device 2. See FIG. 1. Memory 38 may include extra RAM or ROM for storing additional data to be used in the system. EPROM 36 has stored therein a number of applications among which are the ones mentioned and referenced as icons in the mobile office screen of FIG. 4. RAM 34 is the working memory for CPU 32.

Also connected to system bus 30 and being controlled by CPU 32 is a touch screen controller 40 whose function is influenced by a counter 42, which may actually be the system clock. Being controlled by touch screen controller 40 is a tone generator 44. Further connected to touch screen controller 40 is a screen touch overlay 46 (referenced in the aforenoted applications filed on Nov. 1, 1993) that senses pressurized contact, i.e. contacts made on display 10. A LCD display 10, superimposed by touch overlay 46, is also connected to bus 30 to be controlled by CPU 32.

Further connected to system bus 30 is an integrated cellular and PSTN (Public Switched Telephone Network) interface 50 which, for the discussion of this invention, comprises a cellular link as exemplified by antenna 52, a conventional type of serial port, conventional telephone jacks and a modem for data/fax communication. A more detailed discussion of the various features of the communications subsystem of device 2 is given in the first referenced co-pending application.

Figure 6:
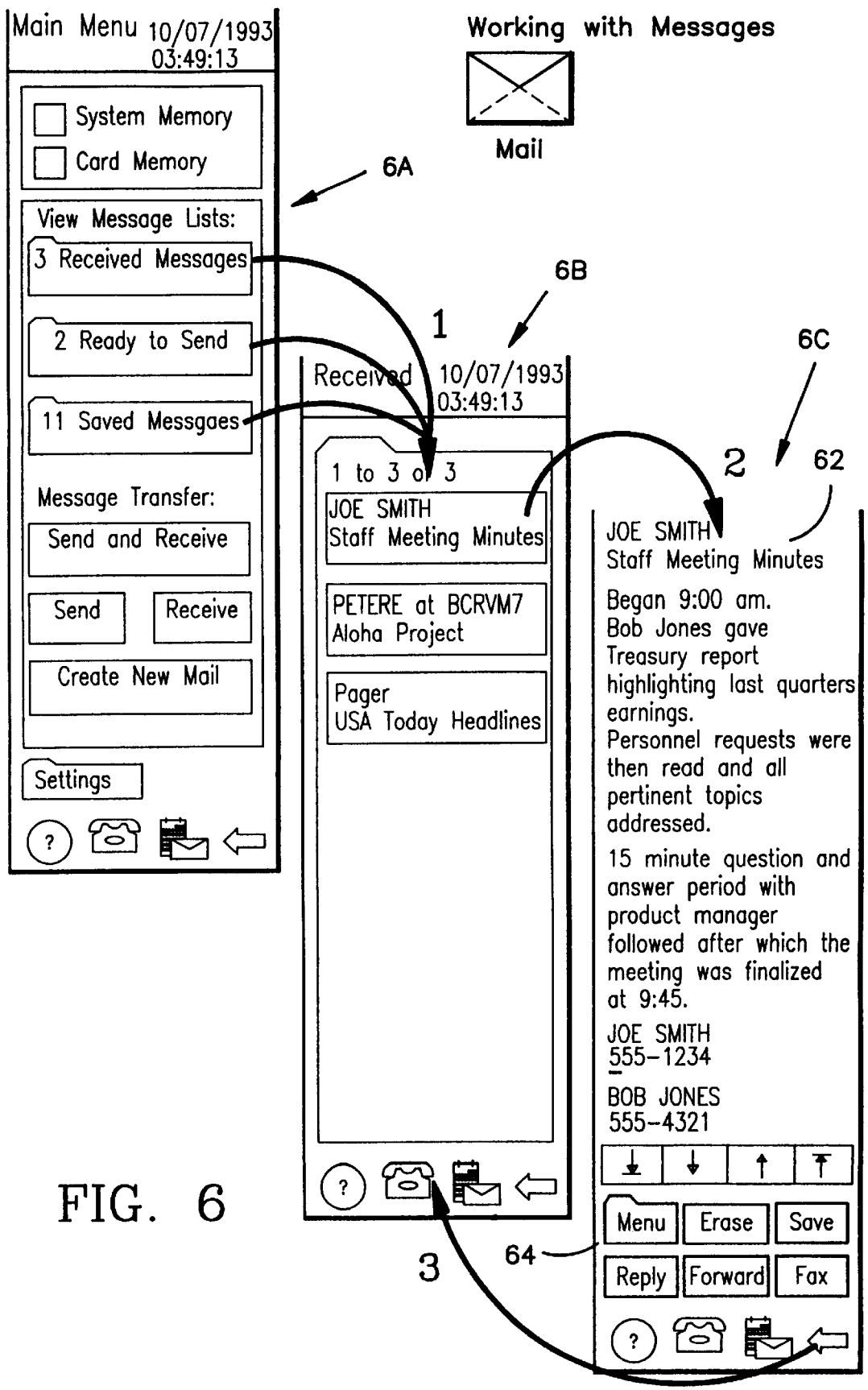
FIG. 6 is a broad overview, via different display screens, illustrating an exemplar embodiment of the instant invention.

The operation of the instant invention system is discussed with reference to FIG. 6, which shows an exemplar E-mail message received by the system. As shown, screen 6A of FIG. 6 displays the main menu representing the "Mail" icon shown in the mobil office screen of FIG. 4. Note that this screen is retrieved from system memory EPROM 36 and provides the user the option of viewing three different types of messages, namely the "Received Messages", the "Ready to Send" messages and the "Saved Messages". Screen 6B shows the three E-mail messages that have been received by device 2. To retrieve screen 6B from screen 6A, the function key entitled "Received Messages" was pressed by the user.

When the user wants to view a particular message, he presses the block that outlines the message. For example, when the user presses the block with heading "Joe Smith", the message relating to Joe Smith is displayed, such as for example in screen 6C. As shown, screen 6C is divided into two areas, namely a text area 62 and a function area 64. Text which includes numbers, letters and spaces are displayed in area 62, whereas a number of function keys and icons are displayed in area 64. Thus, by touching the back arrow icon, the display of device 2 would revert from screen 6C to screen 6B. In the same vein, if the telephone icon is pressed, the phone screen illustrated in FIG. 3 appears. Likewise, if the mobile office icon (shown to include an envelope in front of a pad) is pressed, the mobile office screen shown in FIG. 4 would appear. The question mark icon, if pressed, provides for queries. The shown function and the arrow keys are believed to be self-explanatory.

Because of the communications nature of device 2, to be able to mark a particular portion of the information displayed on the text area would be useful. This ability to mark text is of particular import for E-mail and other types of written notes such as those in the "Note Pad". It is moreover desirable to be able to key in particular text from messages without having to jot it down on paper. Prior to the instant invention, if a user wants to dial a phone number displayed on a screen, he would first need to jot down the number. Thereafter he has to return to the phone screen. It was only after then would the user be able to dial the number. This was found to be inefficient.

For the instant invention, instead of having to copy the desired text, the user can directly mark the text on the screen for further application. The inventive method is discussed with reference to FIG. 7a–7c.

Figure 7C:
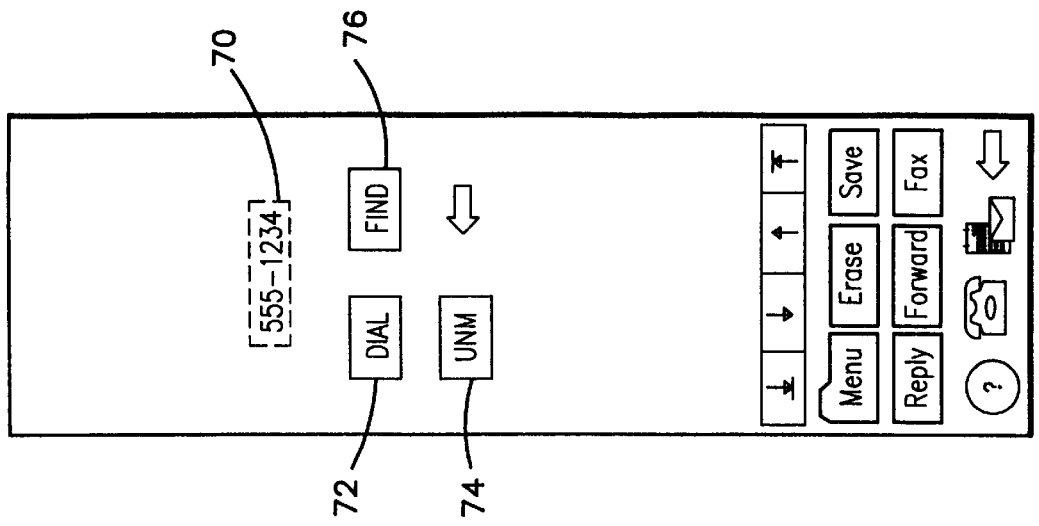
FIGS. 7A–7C illustrate the process of marking desired text on a display screen.
Figure 7B:
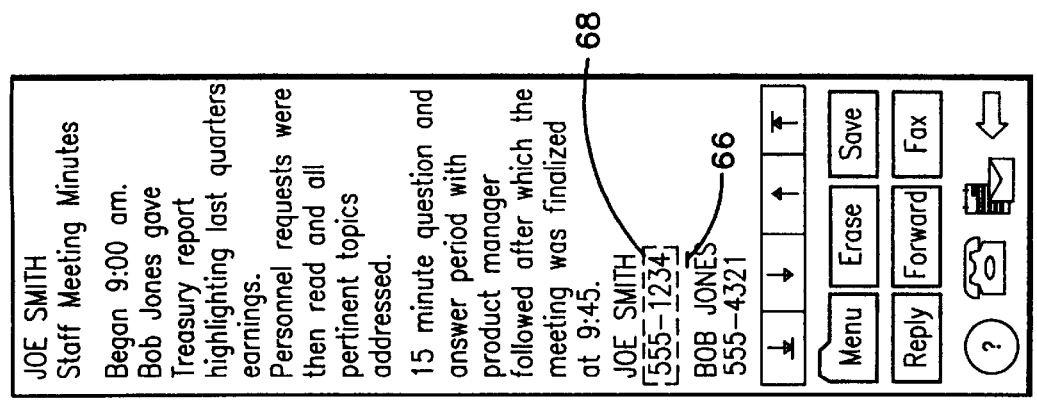
Figure 7A:
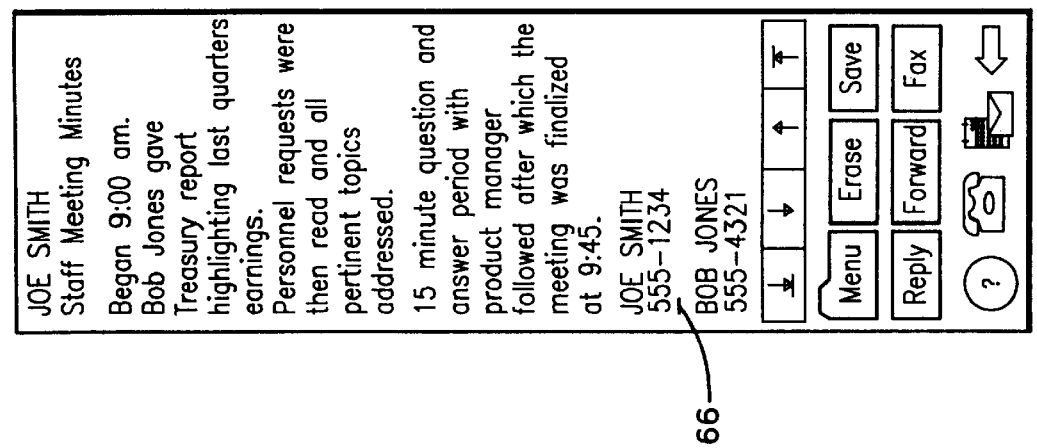

As shown in FIG. 7a, appended to the bottom of Joe Smiths' staff meeting minutes are the telephone numbers for both Joe Smith and Bob Jones, the person who gave the treasury report highlights. If the user wants to find out additional information in regard to the staff meeting, he would naturally want to call up either Joe Smith or Bob Jones. Suppose he wants to talk to Joe Smith. He can easily accomplish this by first positioning the cursor 66 on the screen to the start position of the text that he wants to mark, which in this instance is the phone number of Joe Smith. This he does by touching the screen and moving his finger (or stylus) to the first number of Joe Smiths' telephone number, as at this time the system is in the cursor sliding mode and is programmed to follow the contact point on the screen. As shown in FIG. 7A, cursor 66 is positioned underneath the first "5" of Joe Smiths' telephone number. At this time, the system remains in the cursor sliding mode, that is, the cursor is responsive to and continues to follow the movement of the user's finger.

Because the user wants to mark the telephone number for later use, he needs to initiate the "marking mode" of the system. This he does by holding his finger at the same location of the screen for a predetermined period of time. For the instant invention embodiment, this period of time is taken to be approximately 0.5 to 1.0 second. In the system, this time is provided by counter 42 (or the system clock) of FIG. 5. In other words, counter 42 acts as a timer which reports to touch screen controller 40, which in turn is receiving from the sensor overlay 46 an input that the screen is being touched by the user.

Once it has been determined that the user's finger has been held still at the same location of the screen for the requisite amount of time, screen controller 40 would activate tone generator 44 to sound a beep, which tells the user that the system has now entered into the marking mode.

Upon hearing the marking mode beep, the user can move his finger on the screen to mark the desired text. It should be appreciated that contact should continuously be made by the user to the screen after the initiation of the mark mode in order for the mark mode to continue. Thus, as shown in FIG. 7B, the user has moved cursor 66 to the last number "4" of Joe Smiths' telephone number. As cursor 66 is moved along the desired text, the text over which the contact point is moved, or over which cursor 66 traverses, are accentuated, either highlighted or set in reverse video, as indicated by the dotted box outline 68.

The marking mode continues as long as the user maintains his finger on the screen. Thus, the marked text can vary anywhere from one character to the entire text area 62. The marking mode is terminated when the user removes his finger from the screen. The end of the marking mode is signified by tone generator 44 generating a second beep that is different from the beep that signifies the initiation of the mark mode.

At the end of the marking mode the marked text is displayed in a pop-up window 70 as shown in FIG. 7C. The pop-up screen provides the user with a confirmation that the correct text has been marked. In addition to pop-up screen 70, a number of function keys also appear on the screen. The different function keys each provide an option to be taken with respect to the marked text. For example, if the user determines that the correct text has been marked, as for example the telephone number of Joe Smith, he can next instruct the system to dial that number by pressing the "Dial" function key 72. Alternatively, if he changes his mind, he can un-mark the text by touching function key 74. Furthermore, he can cancel the marked text by pressing the back arrow icon. Thus, for the instant invention, without having to jot down anything, the user can directly call someone by simply marking the desired telephone number and then pressing the "Dial" function key.

In addition to marking telephone numbers, the present invention also is capable of marking other text. For example, if the user wants to find out the number of times Bob Jones has appeared on the text, he only needs to mark "Bob Jones" and then press the "Find" function key 76. The "Find" function can be extended to the various messages stored in the "Mail" directory as well as other files kept at the different directories, such as the "Note Pad" and the "Address Book" directories.

Even though the dialing of a phone number is discussed with reference to the marking of a telephone number, in a co-pending application entitled "Apparatus and Method Therefor of Intelligently Searching for Information in a Personal Communications Device", having Ser. No. 08/279, 640 filed Jul. 25, 1994 and assigned to the same assignee of the instant invention, the marked text does not have to be the telephone number. Briefly, in the just noted co-pending application, by marking an appropriate abbreviated search term, the telephone number of Joe Smith may be directly dialed without any direct reference to his telephone number. Moreover, the marked text may be used in a number of applications aside from the application in which the text is being viewed and marked. For example, the marked telephone number illustrated in FIGS. 7A–7C may be inserted to the address book, and particularly into the Joe Smith address. Or, for that matter, the marked text may be routed to the "To Do" directory file for future calling of Joe Smith, if the user deems it more appropriate to call Joe Smith at a later time.

In any event, the marked number is sent to the integrated cellular and PSTN communications interface 50 to dial the call number.

Figure 8:
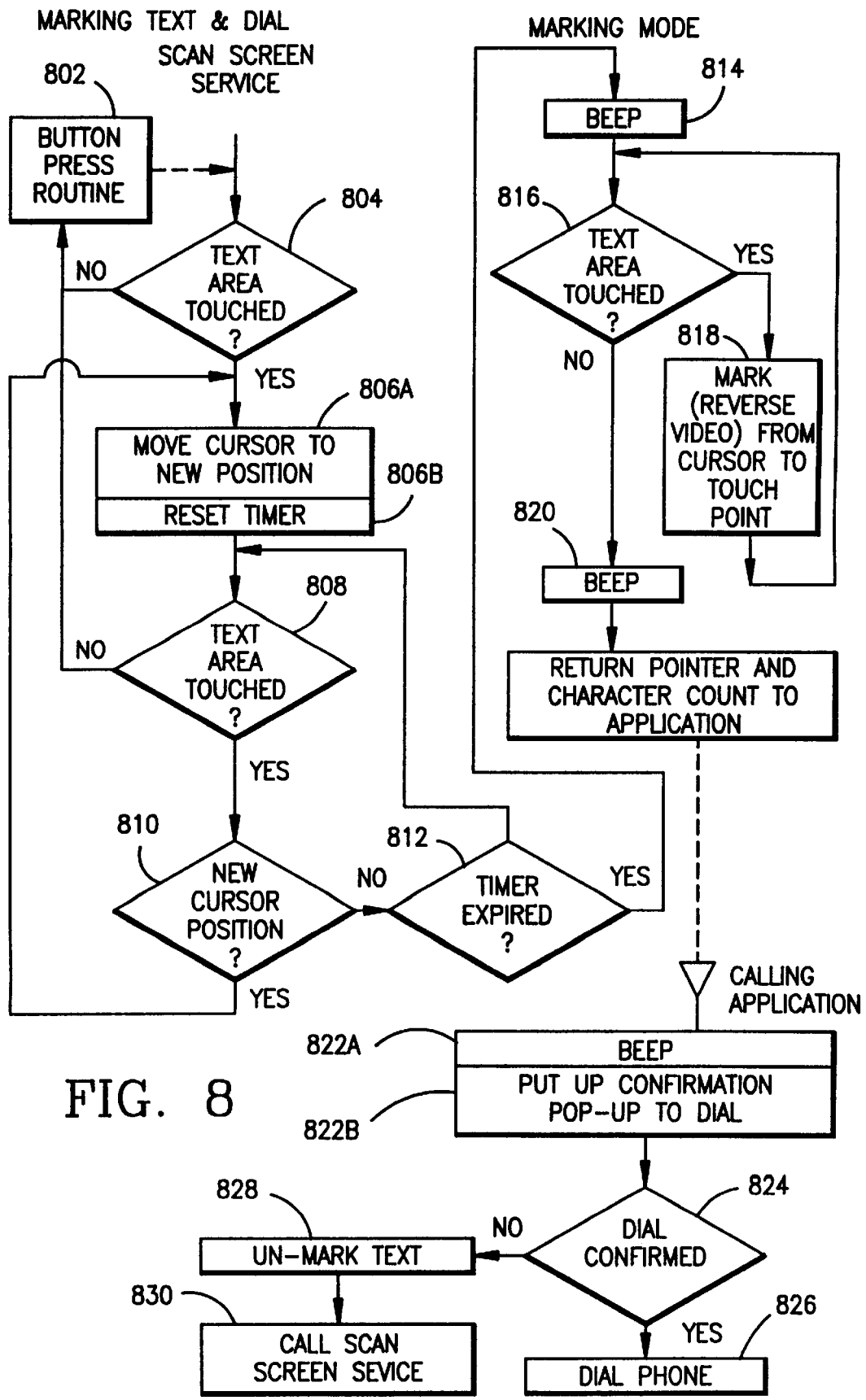
FIG. 8 is a flow chart identifying the different processing steps of the instant invention method.

The operation of marking the text and then dialing it is given in the flow chart of FIG. 8. As shown, the operation starts with the scan screen service routine, which is one of the routines stored in EPROM 36 of the system, and is used by most, if not all, of the applications that run on the device. Putting it simply, scan screen service monitors the buttons (or the function keys) and the icons displayed on area 64 and the text displayed on area 62 of the screen. Whether or not one of the function keys or icons is pressed is determined in button press routine 802. Whether the text area, such as 62 in FIG. 6, is pressed is determined in block 804. If the text area is pressed, the cursor is moved to the pressed position per block 806A. At the same time, a timer, which may be counter 42 or the system clock, is set at block 806B. Thereafter, a further determination is made in block 808 on whether or not the text area is pressed. If not, the process returns to block 802 to determine whether any of the function keys and/or icons have been pressed.

If indeed the text area is pressed, a determination is made on whether there is a new cursor position per block 810. If there is a new cursor position, the processor determines the system as remaining in the cursor sliding mode and the process returns to blocks 806a and 806b to move the cursor to a new position and reset the timer. If it is determined that the cursor position has not been moved, i.e. the user has kept his finger on the same location of the screen, then a determination is made by the processor per block 812 on whether or not a predetermined time period has elapsed. If it has not, the system would again determine whether or not the text area continues to be touched per block 808 and whether the user has moved his finger per block 810.

If it is determined that a predetermined period of time has passed with the cursor being maintained at the same location, the process proceeds to the marking mode by sounding a beep, generated by tone generator 44, per block 814. The system continues to scan the touch sensitive display to determine whether the text area continues to be touched in block 816. If it is, the area of the screen from the point where the marking mode begins to the contact point is marked, by either accentuating the marked text or by reverse video of the same, in block 818. This process continues until the system senses that the text area no longer is being touched, i.e. the user ceases pressing the display screen. With the removal of the contact, a second beep is provided by tone generator 44 per block 820, to notify the user that the mark mode is now terminated.

At the same time, the pointer designating the beginning of the marked text and the number of character counts, i.e. the text that was marked, are provided to a storage such as RAM 34, for use in the different applications.

As was mentioned previously, one of the applications is the calling application which is illustrated in FIG. 7C. With the beginning of the calling application, as the marked number is displayed in the pop-up window 70, yet another beep, which is different from the beeps output at blocks 814 and 820, is provided by tone generator 44, per block 822*a*. The pop-up window 70 is deemed to be a confirmation in block 822*b*. A confirmation is next made by the system in block 824 on whether the marked text is correct. If it is, key 72 is touched per block 826 to call the confirmed telephone number. If not, the marked text can be unmarked by the user touching the unmarked button 74 per block 828. Thereafter, the system returns to the call scan screen service per block 830.

Inasmuch as the present invention is subject to many variations, modifications and changes in detail, it is intended that all matters described throughout this specification and shown in the accompanying drawings be interpreted as illustrative only and not in a limiting sense. Accordingly, it is intended that the invention be limited only by the spirit and scope of the appended claims.

We claim:

1. A method of marking information displayed on a touch sensitive display screen of a computer system, comprising the steps of:

(a) touching said screen at a first location to establish a first position for a cursor displayed on said screen, the movement of said cursor being responsive to the movement of the touch on said screen;

(b) initiating a mark mode whereby marking of information on said screen can begin by continuing touching said screen at said first location to maintain said cursor at said first position for a predetermined time;

(c) movingly touching said screen away from said first location to move said cursor to mark desired information being displayed on said screen; and (d) stop touching said screen to terminate said mark mode;

wherein said computer system further comprises a communications interface means, and wherein after termination of said mark mode the method further comprising the step of:

touching another portion of said screen to confirm that the marked information is correct so that said marked information is used to initiate a call to a call number.

* * * * *